July 1, 1958 R. P. VINCENT Re. 24,497

APPARATUS FOR PUMPING WELLS

Original Filed Dec. 14, 1951 6 Sheets-Sheet 1

RENIC P. VINCENT
INVENTOR.

BY L. Goodwin

ATTORNEY

APPARATUS FOR PUMPING WELLS

Original Filed Dec. 14, 1951 6 Sheets-Sheet 2

RENIC P VINCENT
INVENTOR.
BY L. Goodwin
ATTORNEY

APPARATUS FOR PUMPING WELLS

Original Filed Dec. 14, 1951 6 Sheets-Sheet 3

RENIC P. VINCENT
*INVENTOR.*

BY L. C. Goodwin

*ATTORNEY*

APPARATUS FOR PUMPING WELLS

Original Filed Dec. 14, 1951 6 Sheets-Sheet 4

RENIC P. VINCENT
*INVENTOR.*

BY L. Goodwin

*ATTORNEY*

APPARATUS FOR PUMPING WELLS

Original Filed Dec. 14, 1951 6 Sheets-Sheet 5

RENIC P. VINCENT
*INVENTOR.*

BY L. Goodwin

*ATTORNEY*

APPARATUS FOR PUMPING WELLS

Original Filed Dec. 14, 1951 6 Sheets-Sheet 6

RENIC P. VINCENT
*INVENTOR.*

BY L. Goodwin

*ATTORNEY*

United States Patent Office

Re. 24,497
Reissued July 1, 1958

24,497

APPARATUS FOR PUMPING WELLS

Renic P. Vincent, Tulsa, Okla., assignor to Pan American Petroleum Corporation, a corporation of Delaware Original No. 2,698,582, dated January 4, 1955, Serial No. 261,714, December 14, 1951. Application for reissue December 10, 1956, Serial No. 627,726

20 Claims. (Cl. 103—52)

Matter enclosed in heavy brackets [ ] appears in the original patent but forms no part of this reissue specification; matter printed in italics indicates the additions made by reissue.

This invention pertains to an improved apparatus for producing wells. More particularly, this invention relates to improvements in the method and apparatus used to lift oil from a well by means of a pneumatically-operated plunger.

Gas lift plungers, i. e., solid dividers which separate the oil from the lifting gas in a well tubing, not only increase the efficiency of gas lift by preventing the gas from bypassing the liquid, but in some cases make it possible to gas lift a well which could not otherwise be produced except with a plunger pump, or the like. The use of gas lift plungers to produce oil wells, while highly desirable in some cases, has certain limitations. For example, gas lift plungers occasionally become lodged in the tubing, necessitating pulling of the tubing and the loss of production. Furthermore, since the plunger must return to the bottom of the tubing after lifting a quantity of oil to the surface, production is intermittent. The fall of the plunger through liquid in the bottom of the tubing has been found to be so slow that its use in a high productivity well, including wells with high produced gas/oil ratio, is not economical.

It is an object of this invention to provide an improved gas lift plunger system. It is another object of this invention to provide a gas lift plunger apparatus which is substantially continous in operation and which can be repaired without withdrawing the tubing from a well. It is a further object of this invention to provide an improved gas lift system in which substantially the whole operating mechanism is located above the surface and in which the plungers rotate through a continuous cycle. A more specific object of this invention is to provide a cycling plunger gas lift apparatus that will produce liquids from a well with a minimum gas/liquid ratio. These and other objects of this invention will become apparent from the following description in which reference will be made to the accompanying drawings. In these drawings:

This invention comprises, in brief, a cycling gas lift plunger system having parallel power tubing and production tubing in which an accumulation chamber at the lower end of the tubing is maintained under low pressure to permit rapid fill-up and in which the input gas/liquid ratio is maintained very low by preventing gas pressure in the power tubing from being dissipated or bled off each time a plunger lifts a slug of liquid to the surface through the production tubing.

Figure 1:
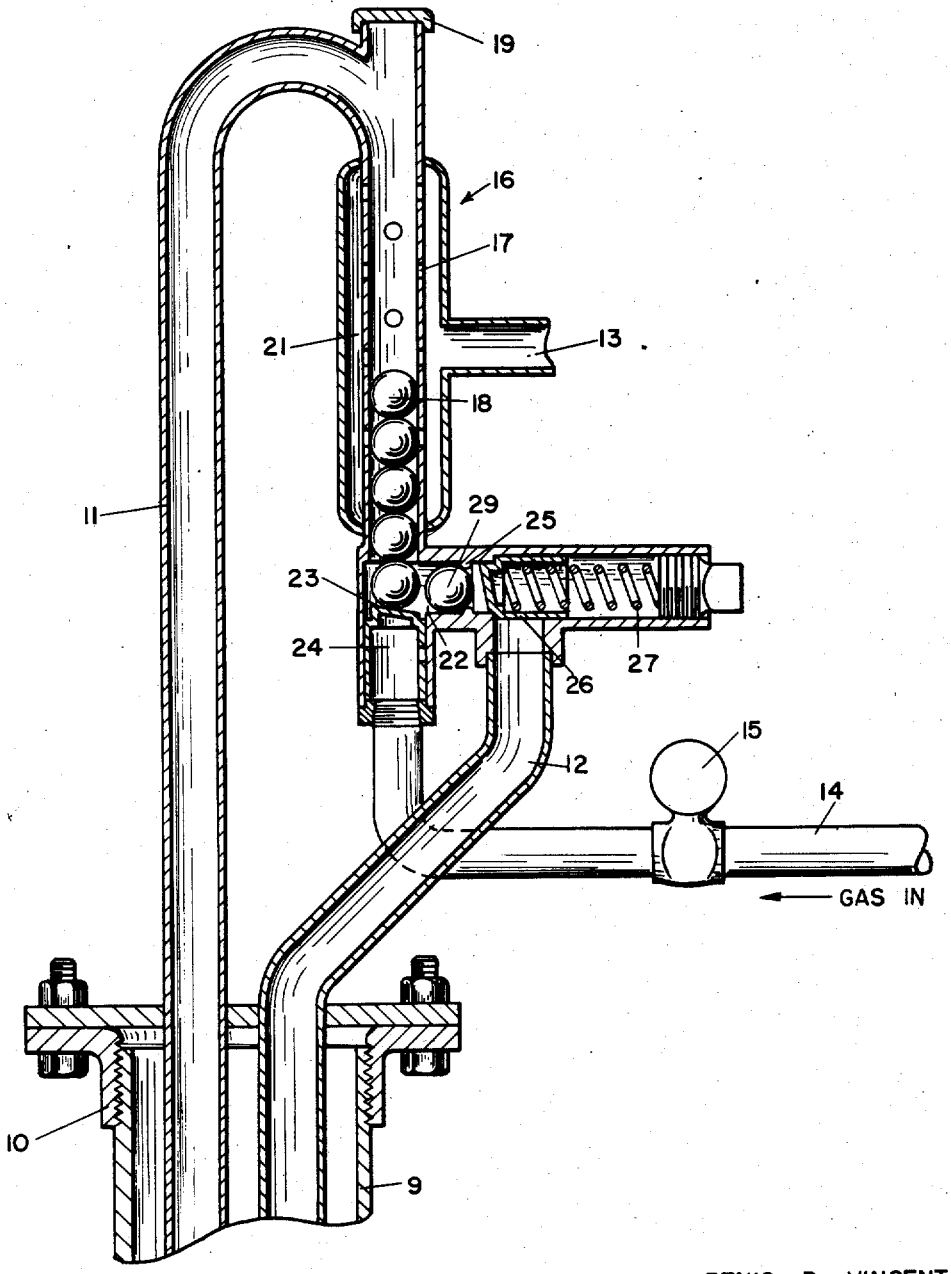
Figure 1 is a cross-sectional view of the well head apparatus used in my herein-described improved gas lift system.

Referring now, particularly to Figure 1, a well having a casing 9 and a tubing head 10 is first equipped with a production tubing 11 and a power gas tubing, hereinafter referred to as the power tubing 12. At the well-head a connection to the flow line 13 is provided through which well fluids and lifting gas from the production tubing flows to a separator, then to a tank or other storage facilities. A supply of power gas, which may be, for example, natural gas or the like from a high pressure gas well, from a compressor, or the like, is connected to the well-head through a power gas line 14. Normally the power gas is injected intermittently into the power tubing. A time cycle control valve 15 is therefore provided. As is well-known, this controller is clock-operated so that at pre-set intervals gas is injected into the well. The amount of gas injected may be controlled by the time cycle control valve or by some other means such as a pressure control valve operating on the power tubing pressure or the like. In the preferred embodiment, injection of gas is both initiated and stopped by the clock-controlled mechanism. A hopper 16, having a perforated plunger chamber 17, is disposed between the production tubing 11 and the flow line 13. This hopper is filled with a supply of plungers 18 through plunger inlet 19. They fall by gravity to the bottom of the hopper as they are produced with the well fluids through the production tubing, and the well fluids and lifting gas flow through the perforations in the plunger chamber into the chamber 21 from which they flow through flow line 13 to storage as described above.

The plungers are typically resilient spheres or balls having a diameter of substantially the same diameter as the production tubing 11 and the power tubing 12 and may be slightly larger. The plungers may, however, be constructed in a variety of ways and from a variety of materials. The plungers may be plastic, wooden, metallic, or the like, and either spherical or flexible so that they can pass through the fittings at the bottom and top of the tubing.

Figure 2:
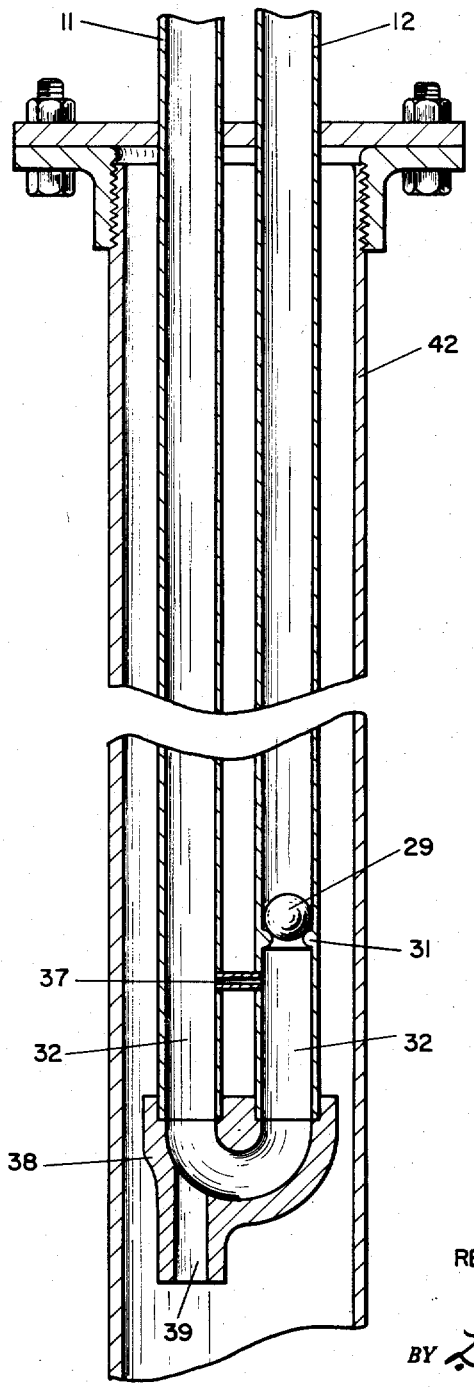
Figure 2 is a cross-sectional view of an embodiment of the subsurface apparatus.
Figure 3:
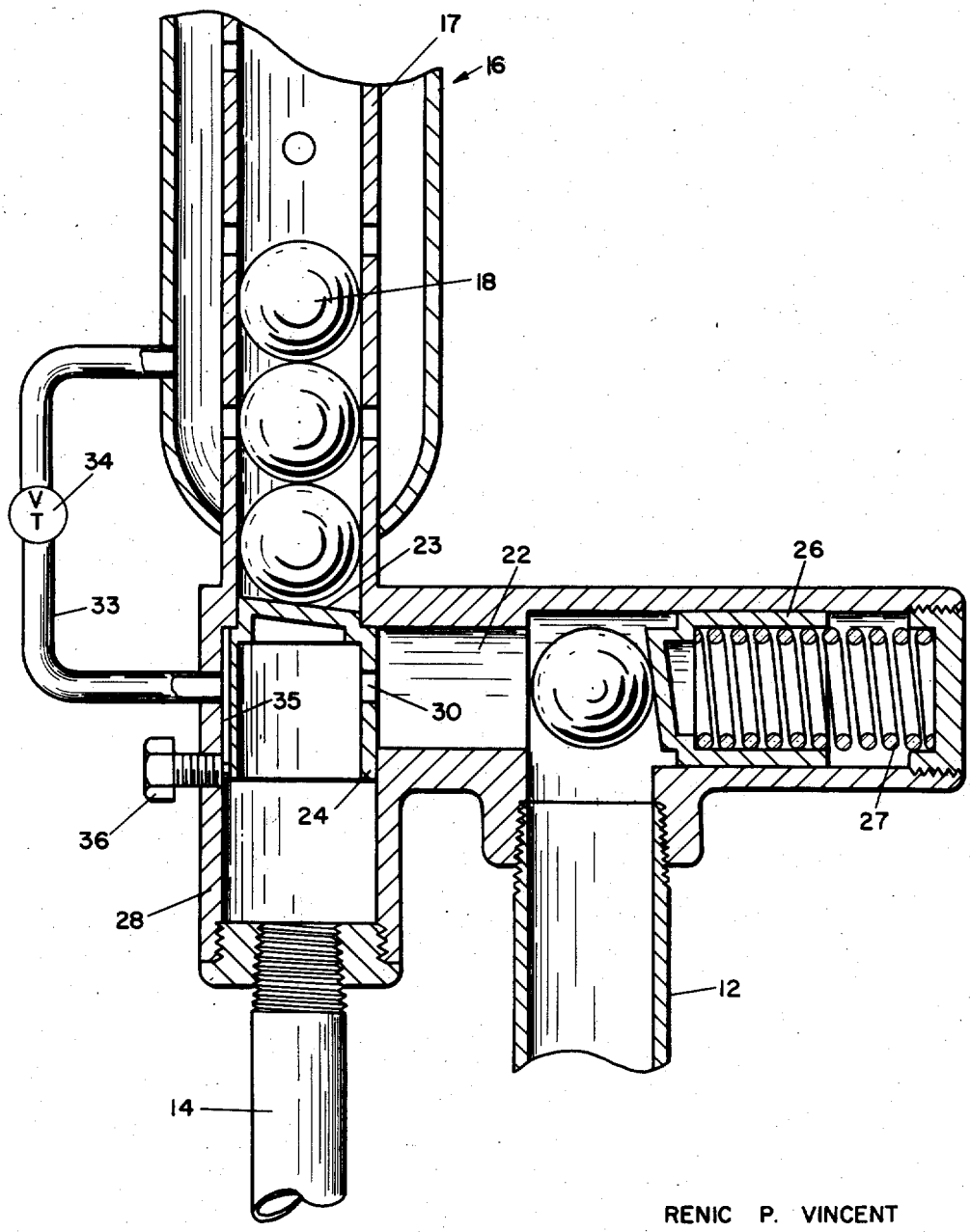
Figure 3 is a cross-sectional view on an enlarged scale of a part of the well head apparatus shown in Figure 1 showing the operation of the plunger injector.

As the plungers fall to the bottom of the hopper, they are deflected into the passage 22 by the inclined surface 23 on valve or piston 24. The first plunger is held in this passage 22 by constriction 25 or by the relief check valve 26 in a position such that it clears piston 24 when the piston is raised. Valve 26 is held in a closed position as shown in Figure 1 by a compression spring 27. Piston 24 reciprocates vertically in gas inlet chamber 28. Inlet of the lifting gas is regulated by time cycle control valve 15 which, as indicated, may be time and/or pressure controlled. When gas is not entering the chamber, piston 24 falls by gravity to the bottom of the cylinder as shown in Figure 1. When time cycle control valve 15 is open and gas is entering the well, piston 24 is raised to the top of its stroke, closing the lower end of the perforated plunger chamber 17 and raising the plungers 18 as shown in Figure 3. One plunger 29 is then separated in the passage 22 from the supply of plungers in the hopper and since high pressure gas cannot enter the hopper, the bottom end being closed, this gas passes through perforation 30 or around piston 24, forcing isolated plunger 29 through the constriction 25. At the same time valve 26 is opened and the isolated plunger is driven by the high pressure gas through the valve down into the power tubing 12. Injection of gas is continued until the plunger 29 strikes constriction 31 which, as shown in Figure 2, is located in the power tubing at substantially the working fluid level of the well, i. e., the level of the liquid in the well as the well is being produced. Since this constriction or orifice is substantially smaller than the plunger, the constriction is plugged by the plunger and the gas pressure in the power tubing commences to increase. Injection of gas is continued until the quantity of gas in the power tubing is sufficient for one operating cycle. That is, the amount of gas in the power tubing is sufficient when displaced from the power tubing by the next plunger to raise the liquid in the accumulation chamber 32 to the surface. At that time, gas injection is discontinued by, for example, closing the time cycle controller 15 in the gas line 14. Spring 27 then forces valve 26 to close. Gas in the gas inlet chamber 28 and passage 22 is then bled off by a small leak or through by-pass 33 into the low-pressure chamber 21 which may be at substantially atmospheric pressure. The by-pass may contain a throttle valve 34 in case it is desired to control the rate of gas bleed off from chamber 28 and passage 22. When the pressure in the hopper 16 and chamber 28 are equalized, piston 24 falls to the lower end of its stroke allowing another plunger to be deflected by surface 23 on the piston into the passage 22. Surface 23 and perforation 30 are properly oriented at all times by groove 35 which extends longitudinally in the piston and cooperates with a pin 36 in the chamber wall. The closing of valve 26 traps high-pressure gas in the power tubing 12. As indicated above, the quantity of gas thus trapped in the power tubing between valve 26 and constriction 31 is sufficient when displaced into the production tubing to raise the liquid accumulated in chamber 32 to the surface. While the amount of liquid carried to the surface by each plunger may be varied over a wide range depending upon the size of casing, tubing, etc. and the available gas pressure, I have found it desirable in many cases to lift about one barrel per cycle. With a one-barrel slug I have also found that about 200-250 cubic feet of gas at standard conditions are required per 1,000 feet of production tubing to lift the fluid to the surface. The amount of the gas trapped in the power tubing, i. e., the pressure at shut-off, can therefore be readily calculated if desired, or it may be determined by trial and error. Typically, I have found that a gas pressure of about 100 p. s. i. in the power tubing at gas shut-off is adequate to lift a barrel of oil. The trapped gas is maintained under pressure in the power tubing 12 until the accumulation chamber 32 is substantially filled. If desired, the gas may be injected into the power tubing at a slow rate so that by the time the pressure in the power tubing is sufficient to extrude a plunger through the constriction, the accumulation chamber is filled.

This accumulation chamber may be constructed to hold any amount of liquid. Generally, its volume depends upon the pressure of the available gas for lifting the liquid to the surface. That is, where high-pressure gas is available and a long column of liquid can be lifted, the accumulation chamber may be designed to hold several barrels. An orifice 37 is provided in the top of the accumulation chamber to permit equalization of the liquid in the accumulation chamber which comprises the lower end of the production tubing 11 as well as the lower end of the power tubing 12. These two tubing strings are connected at the bottom by a header or U-bend 38. The U-bend may contain a fluid inlet 39 which is small enough or otherwise equipped to prevent a plunger from entering.

After the liquid has been allowed to flow into the accumulation chamber until it is substantially filled, time cycle controller 15 again injects gas into the power tubing. As in the previous gas injection cycle, piston 24 is raised, isolating the hopper 16, except for a small amount of leakage through by-pass line 33, from the high-pressure gas. The gas then drives another plunger which has been isolated in passage 22 against valve 26 forcing it to open. When the valve opens, the plunger is driven down into power tubing 12. The first plunger which now rests on constriction 31 is forced through the constriction by the addition of this gas at the surface. That plunger then displaces liquid out of the bottom of the power tubing, the plunger is forced around U-bend 38 into the production tubing which together form a continuous conduit preferably of the same nominal diameter, and all of the liquid in the accumulation chamber is driven to the surface through the production tubing by the gas which follows the plunger. After the second plunger strikes constriction 31, the slug of liquid in production tubing 11 is lifted by the expansion of the gas trapped between the two plungers. This amount of gas, as explained above, is controlled by regulating the pressure of the gas in the power tubing at gas shut-off. Constriction 31 must be small enough to prevent the plunger from passing at this shut-off pressure. The area of the constriction may be in the range 0.3 to 0.9, the area of the conduit depending upon the hardness of the plunger and the pressure desired. When the slug of liquid arrives at the surface it passes first through hopper 16 and perforated plunger chamber 17 into chamber 21 and thence into the flow line 13. The plunger following the slug of liquid is separated from the liquid and falls into the bottom of the perforated plunger chamber with other plungers 18 for reuse. This cycle of operations can, of course, continue indefinitely. The number of plungers in the system at one time may be adjusted as desired. Obviously, three plungers are sufficient for operation but the number may be increased substantially so that the wear on each plunger per unit of time will be decreased. I have found that in the preferred embodiment where the plungers are of solid synthetic rubber, the wear on the plungers is almost negligible and that with as little as three plungers in the system it will operate continuously for as long as a month or more without difficulty due to wear of the plungers.

Figure 4:
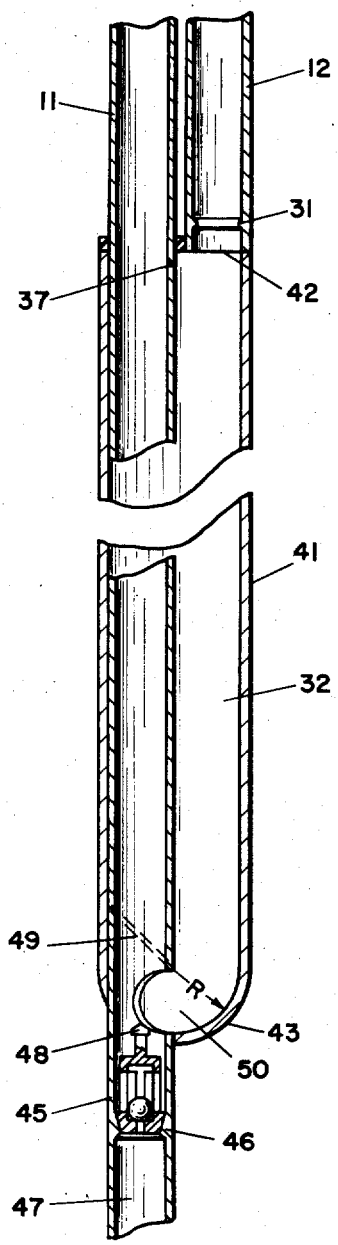
Figure 4 is a cross-sectional view of the lower end of the subsurface apparatus showing an alternate apparatus for accumulating liquid.

It is sometimes desirable to increase the volume of the accumulation chamber 32 so that the back pressure on the well may be reduced to a minimum. Referring now to Figure 4, the volume of this accumulation chamber can be increased several times by providing a large diameter chamber 41 which substantially fills the casing 9. Chamber 41 has an upper head 42 which is connected as by welding to the lower end of power tubing 12. Production tubing 11 extends through the upper head, the head being sealed about the production tubing. This production tubing is continuous through the chamber 41 and extends through the lower head 43. A standing valve 45 which may be of the removable type is seated in a seating nipple 46 within the anchor 47 which is a continuation of the lower end of the power tubing. The standing valve is thus in a position to be removed by lowering a fishing tool through the power tubing. The upper end of the standing valve is preferably arranged so that it tends to prevent a plunger from falling into this anchor. That is, the top of the standing valve or the fishing neck 48 thereon is desirably placed on the outer radius R of lower head 43 as indicated in Figure 4.

An orifice 37, typically a small hole about ⅛–¼ inch in diameter, is drilled through the production tubing near the upper head inside of the accumulation chamber to permit the fluid level in the chamber 41 to be equalized with the fluid level in the production tubing. A deflecting baffle 49 of conical form is placed in the lower end of the chamber 41 to direct a plunger into the lower end of the production tubing through an opening 50.

The operation in this embodiment is substantially identical to the operation in the previously described embodiment. A plunger which rests on constriction 31 is driven into the chamber 41 when sufficient differential pressure is applied to the plunger as above described. The specific gravity of the plunger, particularly in the case of a synthetic rubber plunger such as neoprene, is substantially equal to the specific gravity of the liquid in the accumulation chamber. Therefore, as the high-pressure gas in the power tubing 12 forces the liquid level in chamber 41 down, the plunger and the liquid level fall at about the same rate. When the plunger reaches the bottom of chamber 41, goes through opening 50, and starts up production tubing 11, very little, if any, liquid is left behind the plunger. Any liquid behind the plunger will, of course, be by-passed by the gas which drives the plunger up through the production tubing but will be produced on the next cycle.

Figure 5:
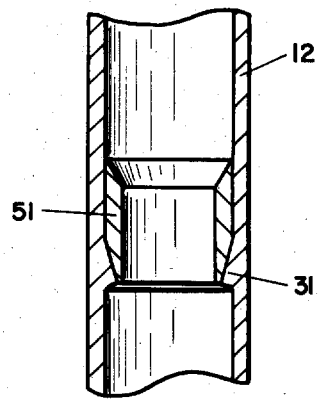
Figure 5 is a cross-sectional view of a removable constriction for retaining the plunger in the lower end of the power tubing.

It may be desirable in some cases to change the size of the restriction 31. That is, after the tubing has been lowered into the well it may become desirable to lift a greater or lesser amount of liquid or to lift the same amount of well fluid with a different amount of gas on each cycle of a plunger. In order to increase this gas pressure and gas volume, the size of the constriction 31 must be decreased to prevent the plunger from being forced through when the differential pressure across the constriction is increased. Alternatively a larger constriction may be required to reduce the volume of gas. A removable constriction 51 is shown in Figure 5. The outside diameter of the removable constriction is greater than the diameter of the constriction 31 and therefore seats on constriction 31. Packing means may be provided to prevent leakage of gas between removable constriction 51 and constriction 31. The hole through the removable constriction is smaller than constriction 31 and therefore withstands a higher differential pressure and allows more gas to be accumulated in the power tubing between plungers. The size of this hole can be determined by calculation, by pilot tests at the surface, or by a test in the well. In the latter case, it will be apparent that if the removable constriction is dropped into the power tubing and it is later determined to be too small or too large, the removable constriction can be removed readily by inserting a plunger in the production tubing, applying fluid pressure behind it, and lifting the removable constriction out of the power tubing as the plunger is driven up to power tubing with the compressed gas or liquid.

Figure 6:
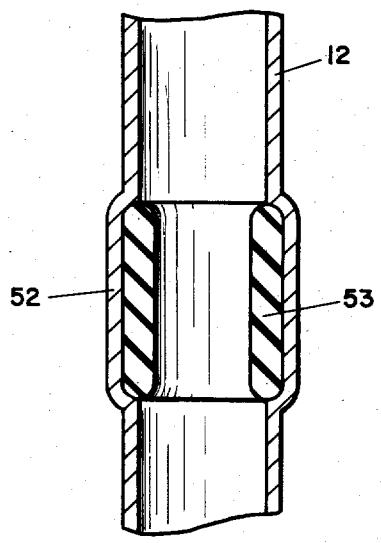
Figure 6 is a cross-sectional view of an alternate embodiment of a constriction for retaining the plunger in the lower end of the power tubing.

As indicated above, in the preferred embodiment the plungers 18 are preferably resilient spheres such as rubber balls or the like. In the case of oil production, the rubber balls preferably are of synthetic material such as neoprene, which will not deteriorate in the presence of well fluid. In the case of such resilient plungers, the constriction 31 may be rigid. Where rigid plungers such as wood or metal plungers are used, it may be desirable to use a resilient construction. An apparatus of this type is shown in Figure 6. Power string 12 in this case contains a section 52 of enlarged inside diameter. A resilient cylindrical constriction 53 is then placed in the enlarged section. The resilient cylindrical constriction is preferably a synthetic rubber sleeve which may be vulcanized or otherwise fastened to the inside of the enlarged section. With a constriction of this type either resilient or non-resilient plungers may be used in the system.

Figure 7:
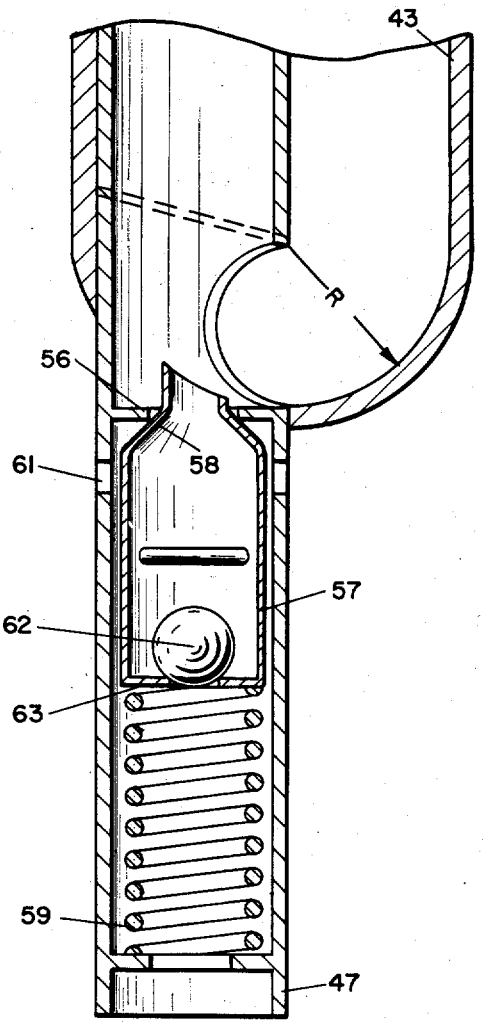
Figure 7 is a cross-sectional view of a relief-type standing valve which permits excess liquid in the tubing to be displaced back into the well.

In the operation of my gas lift system, as above described, the quantity of liquid which can be lifted in each slug is dependent, among other things, upon the available gas pressure. The system is normally designed to lift the largest quantity of liquid which can be lifted with the available gas pressure. As is well-known, the working fluid level in a well is substantially below the static fluid level. Accordingly, when, for any reason, the operation of the system is discontinued for any length of time, the liquid in the accumulation chamber builds up so that more than the desired amount of liquid must be lifted on the first cycle of a plunger. In some cases, particularly where the operation is at a pressure close to the pressure of the lifting gas supply, this build-up is so great that it is impossible to "kick the well off," i. e., to lift the first slug of liquid to the surface. In such case, I may provide any of a number of means which will now be described to start production. One method involves displacing liquid in the accumulation chamber and in the production tubing back into the well or into the formation. As shown in Figure 7 the well fluids may be displaced from the power tubing through a resiliently-mounted standing valve located below the lower head 43 of the accumulation chamber, preferably in the anchor 47. A normally closed relief valve seat 56 is provided at the upper end of anchor 47. This valve seat is desirably very close to the bottom head 43 so that a plunger cannot enter the anchor. A standing valve cage 57 having a valve member 58 at the top is seated against valve seat 56 and held in a seated position by a spring 59. That spring is made strong enough to maintain this relief valve seated under normal operating conditions. When an unusually high pressure is applied in the production tubing, however, valve cage 57 is forced downwardly, unseating the valve member 58 and allowing excess liquid in the tubing to be displaced around the valve cage through ports 61. After the excess liquid has been displaced from the plunger conduit, the standing valve which has a ball 62 and seat 63 functions in the normal way to permit fluid to enter the system whenever the differential pressure across the standing valve is great enough to displace ball 62 from its seat.

Figure 8:
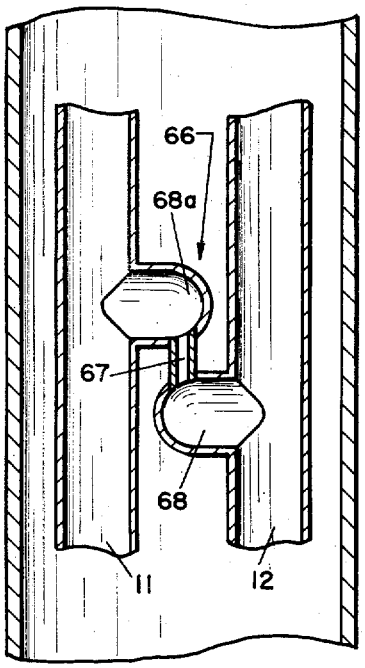
Figure 8 is a cross-sectional view in a vertical plane of an apparatus for unloading excess liquid from the tubing.
Figure 9:
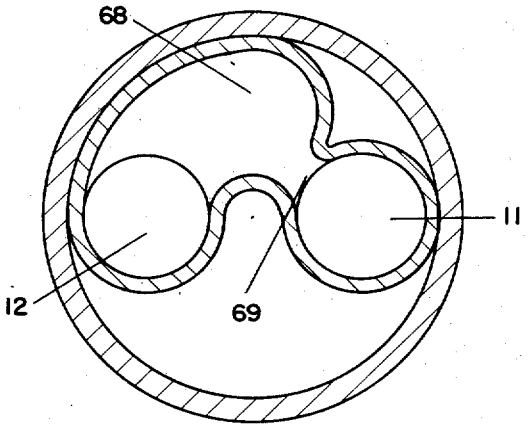
Figure 9 is a cross-sectional view in a horizontal plane of an alternate apparatus for unloading excess liquid from the tubing.

Alternate means for unloading the production tubing and accumulation chamber when an excess amount of liquid enters between cycles are shown in Figures 8 and 9. One or more gas by-pass fittings 66 into which both production tubing 11 and power tubing 12 are connected may be spaced along the tubing. The number and interval between these by-pass fittings is dependent upon the available lifting gas pressure. These fittings provide means such as an orifice 67 for selectively injecting gas into the liquid in the production tubing to aerate that column so that the fluid level may be lowered therein. The orifice is relatively small in comparison to the diameter of the tubing. In two inch tubing the orifice diameter is typically in the range 1/16–1/4 inch. The surface operation of a system equipped with one or more fittings 66 is similar to the operation without such fittings. When gas is first injected into the power tubing it displaces the fluid level down to the level of the first by-pass fitting, then it passes through the orifice 67 and aerates the liquid in the production tubing above that point causing some of the liquid to be produced at the surface. When the first plunger is injected into the power tubing it is carried by the lifting gas into the cavity 68 in the by-pass fitting. Being too large to be extruded through orifice 67, the plunger is tripped in the cavity and plugs the orifice. Injection of additional gas then displaces the fluid level in both the power tubing and the production tubing down to the next by-pass fitting. The orifice in that fitting is plugged by the second plunger. The fluid level can thus be lowered from any elevation in the well to a level which permits regular operation around the continuous conduit as above described. The plungers in cavities 68 can be removed as desired by injecting gas into production tubing 11 and displacing the plungers up the power tubing to the surface. In some cases it may be desirable to inject a series of plungers into the production tubing to remove the plungers from all of the cavities 68. The plungers injected into the production tubing obviously will selectively enter the cavities 68a as the gas flows through orifice 67 and displaces plungers lodged in cavities 68. When the well has thus been "kicked off" operation can be continued as above described.

A modification of the apparatus described above is shown in Figure 9. The constriction 69 between the production tubing 11 and the power tubing 12 is substantially larger than orifice 67. The diameter of constriction 69 is in the same size range as constriction 31 but smaller. Typically, constriction 69 is from about 1/16 to about 1/8 inch smaller in diameter than constriction 31. Normally, one by-pass fitting having a constriction 69 is installed in the system above the accumulation chamber. The spacing is typically from about 100 to several hundred feet, depending upon the pressure of available lifting gas. In some cases, particularly in high static fluid level wells, more than one such fitting may be installed in the system. In a system with two or more such fittings the constriction 69 is successively smaller by about 1/16–1/4 inch in diameter than the next constriction below it. Having these constrictions between the power tubing and the production tubing the well may be produced at different fluid levels or the fluid level may be lowered as desired. The operation is similar to the operation of my system as described above. As lifting gas is first injected into the well through the power tubing, the fluid level is lowered to the first by-pass fitting. A plunger is then introduced into the power tubing and is followed by additional lifting gas. The plunger follows the gas flow until stopped in cavity 68. As additional gas is injected into the power tubing the fluid level in the power tubing is lowered. If the pressure required to force the first plunger through constriction 69 is less than the pressure required to lower the fluid level to the next lower [construction] *constriction*, the first plunger is forced through constriction 69 and the well fluids above that level are lifted to the surface. The well fluids may then be produced from that level until the column of well fluids is lightened as by the production tubing becoming filled with "live" oil or until a plunger is lodged in cavity 68. To expedite producing from a lower level a harder plunger may be introduced and lodged in the cavity 68. The next plunger introduced, after the constriction is plugged, will drive the liquid level in the power tubing down to the next lower by-pass fitting or to the constriction 31 from which the well is produced as above described. While in normal operation the fluid level of a well does not vary extensively, if the operation is stopped for any reason, it can be seen that I have provided means by which the well can be "kicked off" automatically.

For the most efficient and economical operation of my gas lift system it is desirable that the gas/liquid ratio be maintained at a minimum value. Therefore, it is desirable that the amount of gas in the power tubing between plungers be the minimum that will lift a quantity of liquid to the surface from the accumulation chamber. That is, when a slug of liquid is produced from the production tubing, there should be very little additional energy in the gas which is wasted. Accordingly, at the initial setting the gas input per cycle is reduced to the minimum amount required to lift a plunger and its load of liquid to the surface with each gas injection.

Should conditions in the well or on the surface change so that a slug of liquid is not lifted completely to the surface with the gas between two consecutive plungers, the system will continue to operate but the efficiency will be decreased. If a load of liquid does not reach the surface, a high back pressure will be maintained on the system so that additional well fluids cannot enter. The plunger injector will continue to operate and the gas pressure in the power tubing will rise until the differential pressure across the constriction is sufficient to extrude another plunger. The additional gas thereby admitted to the production tubing lifts the load of liquid to the surface and the two plungers are discharged at the surface with no well fluids between. Surface apparatus adapted to increase the gas input per cycle and prevent such unsteady operation is shown in Figure 10.

A by-pass line 71 is inserted between gas line 14 and power tubing 12. A back pressure controlled valve 72 in this by-pass line is normally held closed by a spring 73. Power tubing pressure is transmitted through line 74 to diaphragm 75. The force of spring 73 is adjusted to hold valve 72 closed against the force of diaphragm 75 during normal operation. When a load of liquid fails to reach the surface due to an insufficient quantity of lifting gas, the pressure in the power tubing increases each time the time cycle controller 15 admits gas. This pressure increase is transmitted to diaphragm 75, and the force of the diaphragm overcomes the force of spring 73, valve 72 opens, and high-pressure gas from gas inlet line 14 purges the system. In addition to this by-pass system for clearing the system as required or in lieu thereof, it is sometimes desirable to change the amount of gas injected each cycle so that an unsteady state does not persist.

Figure 10:
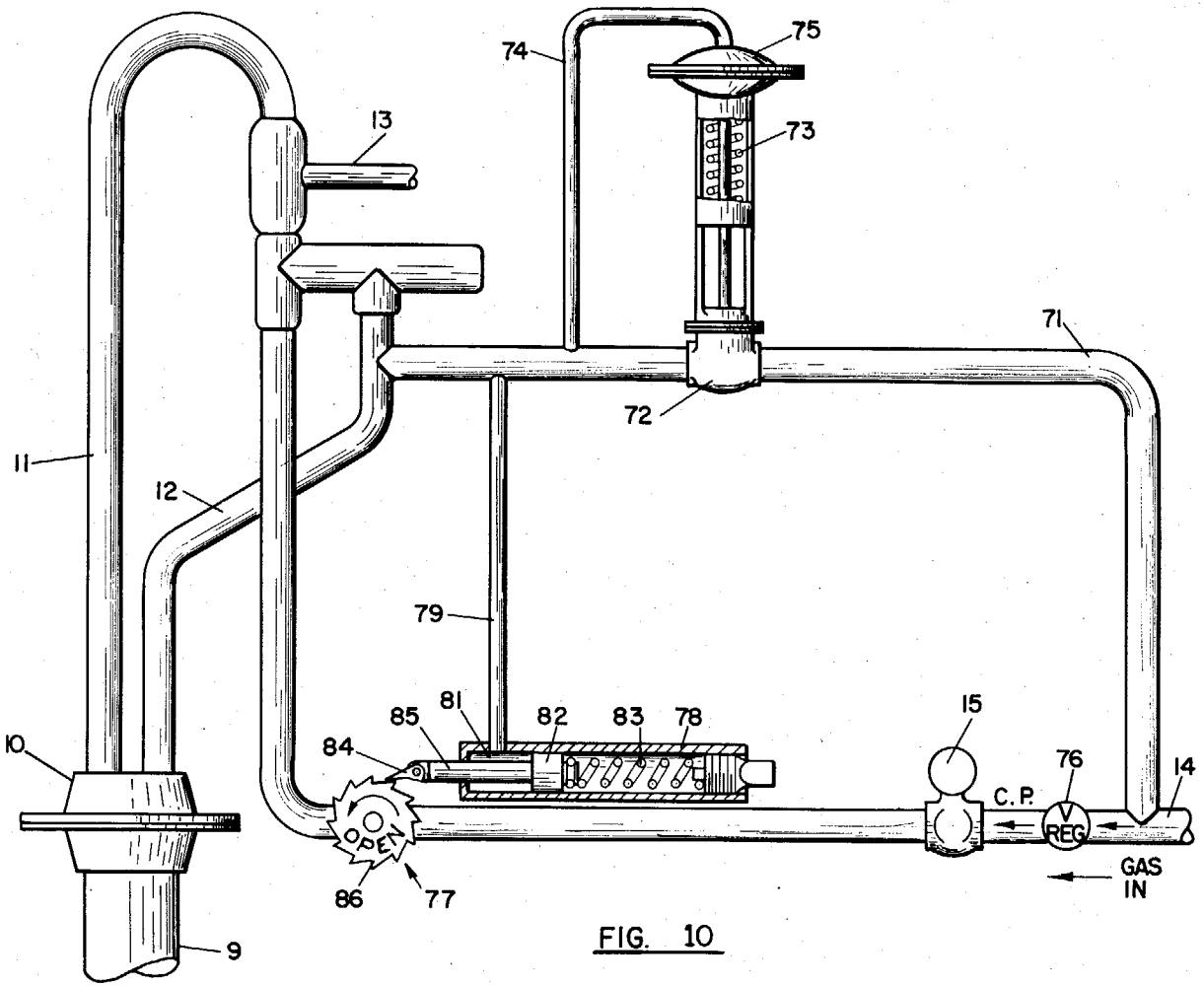
Figure 10 is a diagrammatic layout of surface connections showing means to change the gas/liquid ratio automatically when the gas injected is insufficient to lift a quantity of liquid to the surface.

Means for automatically increasing the gas input per cycle is also shown in Figure 10. A constant pressure regulator 76 disposed in gas line 14 downstream from the by-pass line 71 reduces the pressure of the lifting gas to a constant. Consequently, if the time cycle controller is open each cycle for the same length of time the amount of gas injected into the power tubing each cycle is the same. A variable choke or throttle valve 77 in the gas line 14 downstream from the pressure regulator provides means to vary the volume of gas injected each cycle. An automatic choke regulator 78 opens the throttle valve 77 as more gas is required to displace a load of liquid from the well. In the operation of this regulator, pressure from the power tubing is transmitted through line 79 to a pressure chamber 81. An increase in pressure forces piston 82 to the right, compressing spring 83 and moving the dog 84 with piston rod 85. In stable operation dog 84 slides back and forth on ratchet wheel 86 without moving the ratchet wheel. When the pressure on power tubing 12 is increased due to injection of insufficient gas each cycle as above described, piston 82 and dog 84 are moved further to the right than in normal operation. This additional movement causes dog 84 to fall into a new notch in ratchet wheel 86. As the pressure in power tubing 12 is then reduced, ratchet wheel 86 is turned counterclockwise and throttle valve 77 is opened by a small increment. Each time an anomalous pressure develops in the power tubing the throttle valve is thus opened to admit a small amount of additional gas to stabilize the flow from the well. The wasting of gas and a minimum gas/liquid ratio is thus automatically maintained at all times.

As an example of the operation of the invention herein described, an installation was made in a well in the Cedar Lake Field, West Texas, which produced about 25 barrels of dead oil per day. Two-inch power tubing and production tubing were run side-by-side into 7 inch—23 pound casing to a depth of 4542 feet. A restriction having an open area of 1.5 square inches was placed in the power tubing 150 feet above the lower head. A series of 2.032-inch diameter Hycar ball plungers was then circulated down through the power tubing, the constriction, the accumulation chamber, the production tubing, and the plunger hopper, as above described, using natural gas as the lifting gas. Gas at a pressure of 300 p. s. i. was injected into the power tubing for 3 minutes. When gas injection was stopped, the pressure in the power tubing was 80 p. s. i. After about 37 minutes, gas was again injected into the powder tubing for another 3-minute period. During this period the pressure in the power tubing built up to 160 p. s. i. and the plunger was driven through the constriction. About 0.6 barrels of oil were lifted to the surface and the pressure in the power tubing had dropped to 80 p. s. i. when the second plunger arrived at the constriction. The gas/oil ratio was thus about 1,000 cubic feet per barrel or 220 cubic feet per barrel per 1,000 feet of lift. Similar wells producing on intermittent gas lift without a plunger have been found by comparison to produce with a gas/oil ratio in the range 300–400 cubic feet per barrel per 1,000 feet of lift.

It will thus be seen that this invention is subject to a wide variety of embodiments, many of which have been herein described by way of illustration. The invention is, however, obviously not limited to these embodiments and should be construed to be limited only by the scope of the appended claims.

I claim:

1. An apparatus for gas lifting a well with a series of plungers comprising a production tubing and a power tubing, a head at the lower end connecting said production tubing and said power tubing together as a continuous conduit within said well, means forming a constriction in said power tubing, at least one of said means and said plungers being resilient, an inlet below said constriction to admit well fluids into said conduit within said well, a plunger injector for delivering plungers serially into the upper end of said power tubing, means to inject lifting fluid into said power tubing behind each of said plungers, and means at the upper end of said production tubing for discharging said well fluids from said conduit.

2. An apparatus for gas lifting a well with plungers comprising production tubing and power tubing extending into said well below the working fluid level therein, means adjacent the lower end for connecting said power tubing and said production tubing together as a continuous elongated conduit, means forming a constriction in said power tubing, an inlet for well fluids at the lower end of said elongated conduit, a plurality of well plungers, at least one of said means forming a constriction and said plurality of well plungers being resilient, a plunger injector for delivering said plungers serially into the upper end of said power tubing, means for injecting lifting fluid behind each of said plungers, and means at the upper end of said production tubing for separating plungers from said well fluids, discharging said well fluids from said conduit, and returning the separated plungers to said injector.

3. An apparatus according to claim 2 in which said constriction is located in said power tubing at about the working fluid level of said well.

4. An apparatus according to claim 2 in which a standing valve is located in said inlet.

5. A pump for lifting well fluids from a well comprising parallel production tubing and power tubing extending into said well below the fluid level therein, means at each end for connecting said power tubing and said production tubing together as a continuous elongated conduit, means forming a constriction in said power tubing at about the working fluid level of said well, an inlet for well fluids below said constriction for admitting well fluids into said conduit within said well, a standing valve in said inlet, a multiplicity of resilient plungers in said conduit, a plunger injector for delivering said plungers individually into the upper end of said power tubing, means to inject predetermined quantities of lifting gas into said power tubing behind each of said plungers, and means at the upper end of said elongated conduit for separating said plungers for said well fluids and discharging said well fluids from said conduit.

6. An apparatus according to claim 5 in which said plungers are resilient balls.

7. An apparatus according to claim 5 in which said power tubing and said production tubing have the same nominal diameter and in which said plungers have a diameter about equal to said nominal diameter.

8. An apparatus according to claim 5 in which the area of said constriction is in the range between about 0.3 and 0.9 of the nominal area of said conduit.

9. An apparatus according to claim 5 in which said means forming a constriction is removable whereby said means forming a constriction may be removed without pulling the power tubing.

10. An apparatus according to claim 5 in which said means forming a constriction is resilient.

11. An apparatus according to claim 5 in which a header fitting is disposed in said production tubing and said power tubing, an orifice in said header fitting producing a fluid by-pass between said production tubing and said power tubing at an intermediate point in said elongated conduit, whereby said well may be kicked off when the fluid level in said conduit is substantially above the working fluid level, and means forming a cavity in said header fitting between said power tubing and said orifice for receiving a plunger and permitting said orifice to be plugged by a plunger without interfering with the cycling of plungers in said power tubing and said production tubing.

12. An apparatus according to claim 11 in which said orifice is smaller in cross-sectional area than said constriction but large enough for a plunger to be forced therethrough, whereby said well may be produced from an intermediate level.

13. In an apparatus for gas lifting a well with plungers including parallel production tubing and power tubing extending into said well below the working fluid level therein, a head at the lower end connecting said production tubing and said power tubing together, an inlet for admitting well fluids into said head, a standing valve in said inlet, and a plunger injector at the upper end connecting said production tubing and said power tubing together, said head and said plunger injector connecting said production tubing and said power tubing together and forming a continuous elongated conduit of approximately uniform diameter, said plunger injector comprising hopper means to separate said plungers from the well fluids and discharge said well fluids from said conduit as they are lifted through said production tubing by said plungers, a gas inlet chamber below said hopper means, means to admit lifting gas intermittently into said gas inlet chamber, an outlet passage from said gas inlet chamber in said conduit, a valve in said gas inlet chamber adapted to close against the pressure of well fluids in said production tubing when gas is injected into said gas inlet chamber at higher pressure and to open when said inlet gas pressure is less than said production tubing pressure, said valve being adapted upon opening to discharge a plunger into said passage, and a relief check valve between said passage and said power tubing, said relief check valve being adapted to open when high pressure lifting gas is injected into said inlet chamber thereby allowing the plunger in said passage to pass into said power tubing and being adapted to close when gas injection is stopped.

14. In a well pumping apparatus having a power tubing and a production tubing extending into a well and connected together at the bottom to form a continuous elongated conduit within said well, a multiplicity of resilient plungers in said conduit, means forming a constriction in said power tubing smaller than said power tubing adapted to be plugged by a plunger and produce a lifting gas reservoir above said constriction, a well fluid accumulation chamber below said constriction, an inlet to said accumulation chamber for well fluids, a hopper at the surface for removing plungers from said well fluids discharging well fluids from said conduit and injecting said plungers in series into the upper end of said power tubing, and a gas injector comprising a high pressure gas line, a pressure regulating valve to produce a gas supply of constant pressure, a time cycle controlled gas inlet valve, a throttle valve between said pressure regulator and said power tubing to admit a constant amount of gas and produce a predetermined pressure in said gas reservoir each time gas is intermittently injected into said power tubing, and means actuated by a pressure in said power tubing above said predetermined pressure for increasing the quantity of gas injected each time said time cycle controlled gas inlet valve is open whereby said well may be operated at a minimum gas/liquid ratio.

15. In a pump for lifting liquid with cycling resilient balls including a power tubing and a production tubing in a well, said power tubing and said production tubing being joined together as a continuous conduit within said well, means to inject lifting gas into said power tubing, means to inject said balls into said power tubing, and a well fluid inlet to said production tubing, the improvement comprising means forming a constriction in said conduit between said power tubing and said production tubing whereby each of said balls is constrained at said constriction to seal a quantity of said lifting gas in said power tubing while the gas ahead of each of said balls in said conduit expands and lifts a slug of well fluids through said production tubing and whereby the lifting gas/well fluid ratio is substantialy reduced.

16. In a well pumping apparatus employing a power gas conductor and a well fluid conductor which are connected at the lower end to provide a continuous conduit in said well through which plungers cycle, a plunger injector comprising hopper means to separate said plungers from the well fluids and discharge said well fluids from said conduit as said well fluids are lifted through said well fluid conductor by said plungers, a gas inlet chamber below said hopper means, means to admit lifting gas intermittently into said gas inlet chamber, an outlet passage from said gas inlet chamber, a valve in said gas inlet chamber adapted to close against the pressure of well fluids in said well fluid conductor when gas is injected into said gas inlet chamber at higher pressure than said well fluid conductor pressure and to open when said inlet gas pressure is less than said well fluid conductor pressure, said valve being adapted upon opening to take a plunger from said hopper and discharge said plunger into said passage, and a relief check valve between said passage and said power gas conductor, said relief check valve being adapted to open when high pressure lifting gas is injected into said gas inlet chamber thereby allowing the plunger in said passage to pass into said power tubing and being adapted to close when gas injection is stopped.

*17. In a pump for lifting liquid with cycling resilient balls including a power tubing and a production tubing in a well, said power tubing and said production tubing being joined together as a continuous conduit within said well, means to inject lifting gas into said power tubing, means to inject said balls into said power tubing, and a well fluid inlet to said production tubing, the improvement comprising a restriction in said conduit between said power tubing and said production tubing whereby each of said balls is constrained at said restriction to seal a quantity of said lifting gas in said power tubing while the gas ahead of each of said balls in said conduits expands and lifts a slug of well fluids through said production tubing, whereby the lifting gas/well fluid ratio is substantially reduced.*

*18. In a pump for lifting liquid with cycling resilient balls including a power tubing and a production tubing in a well, said power tubing and said production tubing being joined together as a continuous conduit within said well, means to inject lifting gas into said power tubing, means to inject said balls into said power tubing, and a well fluid inlet into said production tubing, the improvement comprising means in said conduit between said power tubing and said production tubing to constrain said balls and seal a quantity of said lifting gas in said power tubing while the gas ahead of each of said balls in said conduit expands and lifts a slug of well fluids through said production tubing, whereby the lifting gas/well fluid ratio is substantially reduced.*

*19. A pump for lifting liquid with cycling resilient balls including a power tubing, a production tubing, said power tubing and said production tubing being joined together as a continuous conduit within a well, means to inject lifting gas into said power tubing, means to inject said balls into said power tubing, a well fluid inlet to said production tubing, and a ball retainer in said power tubing upstream from said well fluid inlet to constrain said balls and seal a quantity of said lifting gas in said power tubing until a predetermined differential pressure is built up between said power tubing and said production tubing across said ball retainer to release said balls from said ball retainer.*

*20. An apparatus for lifting a well with a series of resilient balls comprising a production tubing and a power tubing, a head at the lower end connecting said production tubing and said power tubing together as a continuous conduit within said well, a ball restriction to temporarily constrain said resilient balls in said power tubing until a predetermined differential pressure is built up across said ball restriction, an inlet to said conduit downstream from said ball restriction to admit well fluids into said conduit within said well, a ball injector for delivering said resilient balls serially into the upper end of said power tubing, means to inject lifting fluid into said power tubing behind each of said resilient balls and means at the upper end of said production tubing for discharging said well fluids from said conduit.*

References Cited in the file of this patent or the original patent

UNITED STATES PATENTS

| | | |
|---|---|---|
| 971,612 | Holliday | Oct. 4, 1910 |
| 1,563,520 | Owen | Dec. 1, 1925 |
| 1,647,003 | Huber | Oct. 25, 1927 |
| 1,815,364 | Ricker | July 21, 1931 |
| 1,932,497 | Wellensick | Oct. 31, 1933 |
| 2,299,307 | Cornell | Oct. 20, 1942 |
| 2,754,910 | Derrick et al. | July 17, 1956 |

FOREIGN PATENTS

| | | |
|---|---|---|
| 527,345 | Great Britain | Oct. 7, 1940 |
| 551,386 | Great Britain | Feb. 19, 1943 |